Feb. 5, 1935.  A. F. MASURY  1,989,760
CONTAINER AND DISPENSING APPARATUS
Filed Feb. 23, 1933
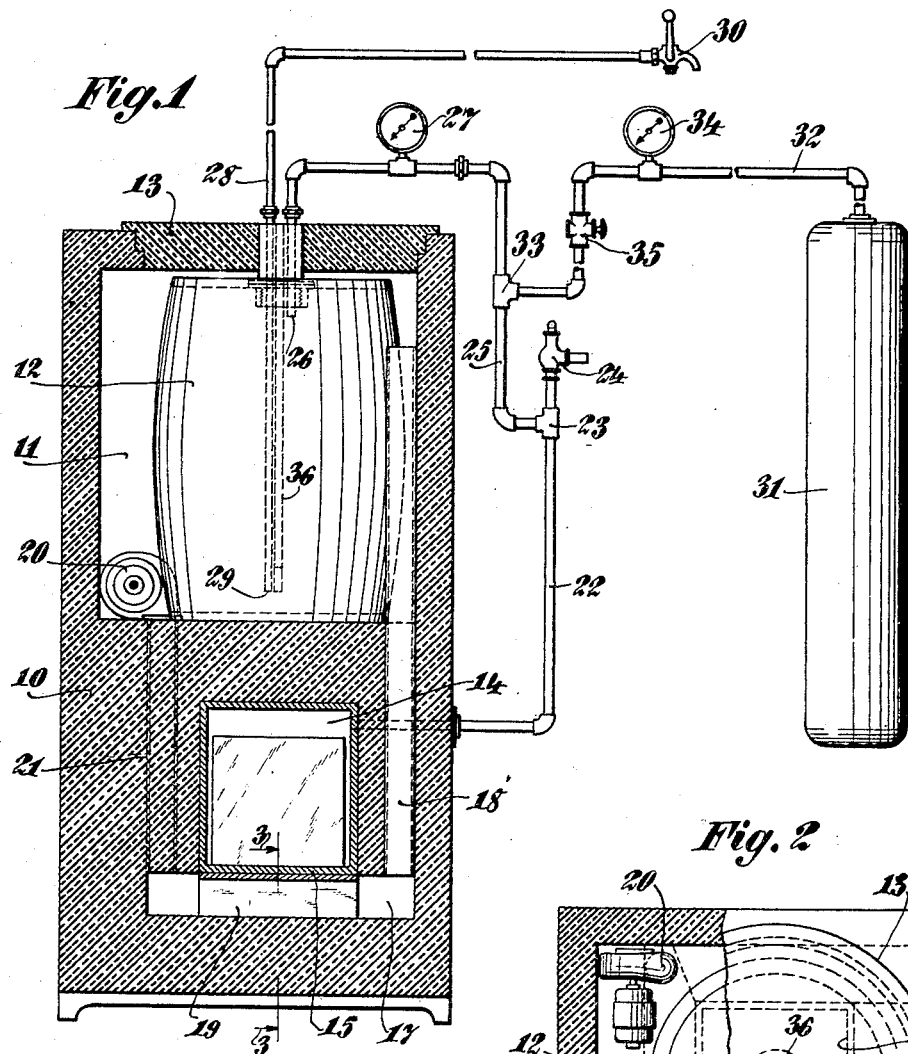
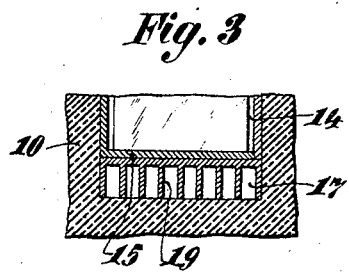
INVENTOR
Alfred F. Masury,
BY
Redding, Greeley, O'Shea & Campbell
HIS ATTORNEYS Patented Feb. 5, 1935

1,989,760

UNITED STATES PATENT OFFICE 1,989,760

CONTAINER AND DISPENSING APPARATUS

Alfred F. Masury, New York, N. Y., assignor to International Motor Company, New York, N. Y., a corporation of Delaware Application February 23, 1933, Serial No. 658,109

5 Claims. (Cl. 62—91.5)

The present invention relates to apparatus for dispensing beverages and embodies more specifically an improved pressure dispensing apparatus by means of which beverage containers may be conveniently connected therewith in such fashion that the contents of the containers may be effectively dispensed by the apparatus. It is further contemplated to provide a dispensing apparatus wherein removable containers may be utilized in connection with the apparatus, the containers being readily replaced when empty by filled containers without disturbing the dispensing apparatus.

In dispensing beverages, such as beer, it is desirable that the beverage be maintained at a predetermined and substantially constant temperature and under pressure such that it may be conveniently dispensed on draught. It is further necessary that the beverage, when dispensed, be carbonated to impart the desired sparkle to the beverage. In order that a dispensing apparatus may be provided wherein the foregoing characteristics are provided, it is an object of the present invention to provide a dispensing apparatus of such character that removable containers may be utilized as a source of beverage, the containers being readily removed and replaced without disturbing the apparatus.

A further object of the invention is to provide a pressure dispensing apparatus wherein the medium dispensed is maintained at a predetermined constant temperature and under a suitable pressure to facilitate the dispensing thereof on draught.

A further object of the invention is to provide an apparatus of the above character wherein the container from which the beverage is dispensed is cooled and maintained under a suitable pressure by a medium which also serves to carbonate the beverage.

Further objects, not specifically enumerated above, will be apparent as the invention is described in greater detail in connection with the accompanying drawing, wherein:

Figure 1 is a view in elevation, showing a pressure dispensing apparatus constructed in accordance with the present invention, the container and pressure and temperature regulating mechanism being illustrated in vertical section therein, the broken plane of the section being illustrated by the line 1—1 of Figure 2.

Figure 2 is a plan view of the container housing, partly broken away and in section to illustrate the details thereof.

Figure 3 is a partial view in section, taken on line 3—3 of Figure 1, and looking in the direction of the arrows.

With reference to the above drawing, a dispensing apparatus is illustrated including a container housing 10 having a cooling compartment 11 within which a removable container 12 is adapted to be received. A cover 13 is provided for the housing, the cover being readily removable to facilitate the replacement of containers within the compartment 11 as will be readily understood. Beneath the compartment 11, a cooling medium compartment 14 is formed in the housing 10, the compartment preferably being formed with a lower wall 15 of good heat conducting qualities. Access may be had to the compartment 14 by means of a side door 16, illustrated in Figure 2 in order that the cooling substance within the chamber 14 may be renewed.

Beneath the bottom wall 15 a heat interchange compartment 17 is formed, the compartment 17 communicating with the compartment 11 by a duct 18 which extends upwardly into the compartment 11 adjacent the upper extremity thereof. Extending downwardly into the heat interchange compartment 17 are fins or webs 19 of good heat conducting properties to facilitate the interchange of heat between the bottom wall 15 and the fluid medium flowing through the compartment 17. To facilitate the flow of medium through this compartment a motor driven fan 20 is mounted within the compartment 11, the exhaust of the fan communicating with compartment 17 through a duct 21. In this fashion, a cooling medium may be effectively circulated through compartment 11, the flow of the medium being accurately controlled by a suitable controlling mechanism for the motor of fan 20. The control of the fan motor 20 may be effected by means of a thermostat 36 which extends within the container 12 and is subjected to the temperature of the beverage therein. This thermostat may be of any suitable form such as illustrated in applicant's copending application Ser. No. 658,108, now matured into Patent No. 1,936,848, issued Nov. 28, 1933.

It is preferred that solid carbon dioxide be used as the cooling medium within the chamber 14 and in order that the gas sublimated therefrom may be utilized as a carbonating medium for the beverage, the gas is carried away from chamber 14 through a pipe 22 which communicates through a fitting 23 with a pressure relief valve 24 and a pipe 25. Pipe 25 extends through the cover 13 and into the container 12 terminating adjacent the top thereof, as indicated at 26. A pressure gauge 27 may be connected in the pipe line 25 to indicate the pressure within the system, as will be described hereinafter.

The medium is dispensed through a pipe 28 which extends into the container 12 and terminates at 29 adjacent the bottom thereof. A faucet 30 is provided in order that the medium may be dispensed through pipe 29 on draught.

To insure a desired pressure within the system under all conditions of operation, an auxiliary container 31 of carbon dioxide is provided, the container being connected by means of a pipe line 32 to a fitting 33 in the pipe line 32. A pressure gauge 34 may be provided in the pipe line 32 to indicate the pressure value in the container 31 and a valve 35 may be provided to control the flow of the medium through the pipe 32. In this fashion, when the pressure available from the sublimating carbon dioxide within chamber 14 is insufficient to dispense the beverage and carbonate the same at the rate desired, the pressure within the container 31 may be availed of to supplement the action of the gas which is sublimated within chamber 14.

It will thus be seen that the cooling medium within chamber 14 not only is utilized to preserve a substantially constant temperature within the chamber 11 but it serves as a pressure and carbonating medium for the beverage within container 12. The dispensing apparatus thus functions efficiently under all conditions to afford a means of supplying the beverage on draught.

While the invention has been described with specific reference to the accompanying drawing, it is not to be limited, save as defined in the appended claims.

I claim as my invention:

1. A dispensing apparatus comprising a housing having a compartment adapted to receive a refrigerant, a heat interchange compartment, a heat conducting plate spacing the compartments, a third compartment in the housing adapted to receive a container, means to circulate air between the last named compartment and the heat interchange compartment, and means to communicate between the first compartment and the container.

2. A dispensing apparatus comprising a housing having a compartment adapted to receive a refrigerant, a heat interchange compartment, a heat conducting plate spacing the compartments, a third compartment in the housing adapted to receive a container, means to circulate air between the last named compartment and the heat interchange compartment, means to communicate between the first compartment and the container, and an auxiliary pressure source communicating with the last named means.

3. In combination with a container and means to direct a fluid therefrom, a cooling element, means to cool the container by the element, means to control the cooling means, and means independent of the cooling means to exert the pressure of the cooling element upon the contents of the container.

4. In combination with a container and means to direct a fluid therefrom, means to cool the container, fluid circulating means between the container and the cooling means, means to control the flow of fluid in the circulating means, and means to exert the pressure of the cooling means upon the contents of the container.

5. In combination with a container and means to direct a fluid therefrom, a compartment communicating with the container and adapted to receive a cooling medium, said compartment being formed with a heat interchange device, a pipe line connecting the compartment with the interior of the container, and means independent of the pipe line to cool the container by directing a flow of a medium over the heat interchange device and the container.

ALFRED F. MASURY.